Oct. 30, 1923.  
C. D. BRIDDELL,  
1,472,510  
MACHINE FOR SHAPING TONG HANDLES  
Filed Aug. 5, 1922  
3 Sheets-Sheet 1
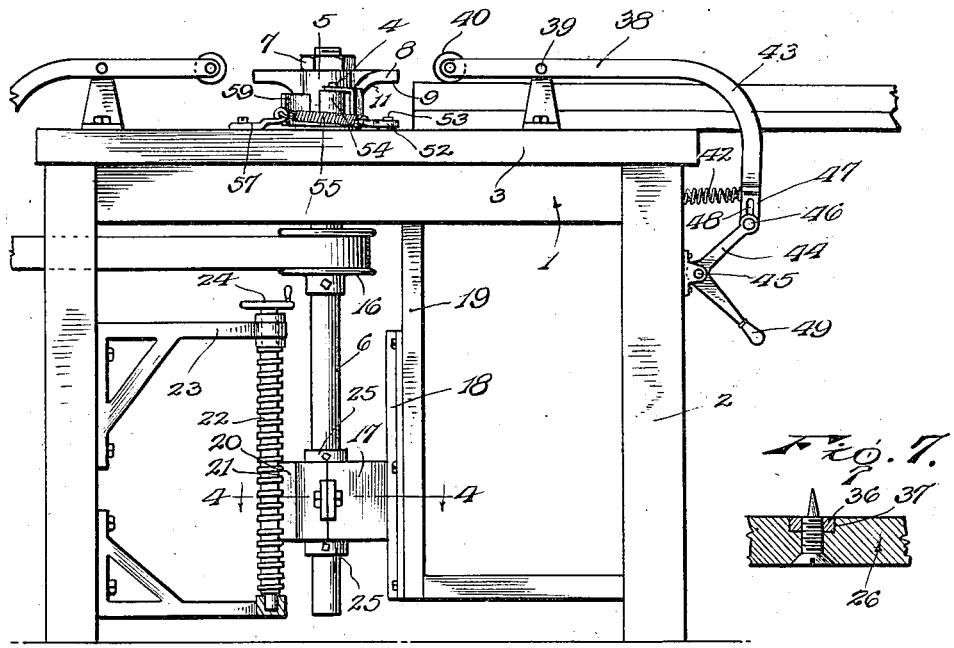
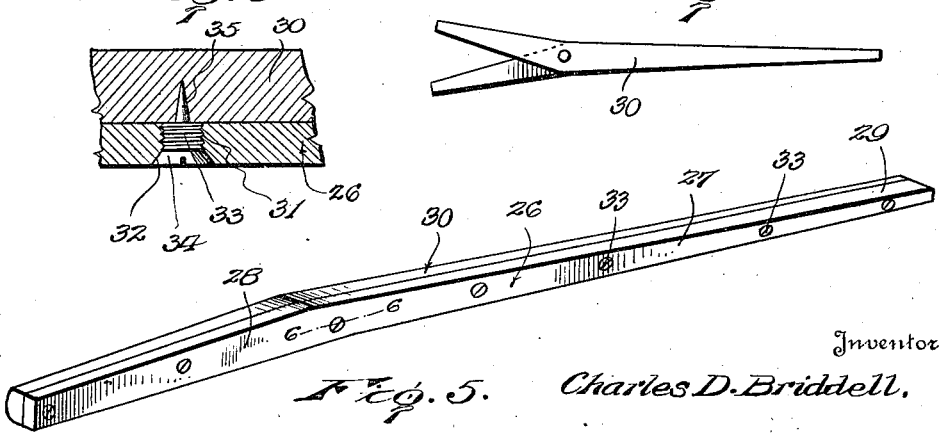
Inventor  
Charles D. Briddell.  
By  
Lacey & Lacey, Attorneys Oct. 30, 1923.
C. D. BRIDDELL
1,472,510
MACHINE FOR SHAPING TONG HANDLES
Filed Aug. 5, 1922
3 Sheets-Sheet 2
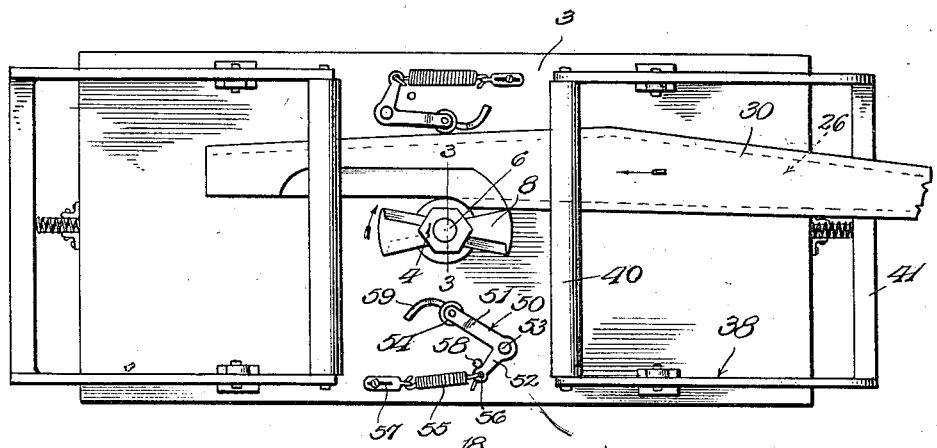
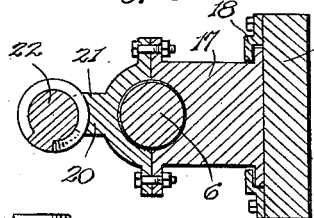
Inventor
Charles D. Briddell.
By Lacy & Lacy, Attorneys Oct. 30, 1923.
C. D. BRIDDELL
1,472,510
MACHINE FOR SHAPING TONG HANDLES
Filed Aug. 5, 1922   3 Sheets-Sheet 3
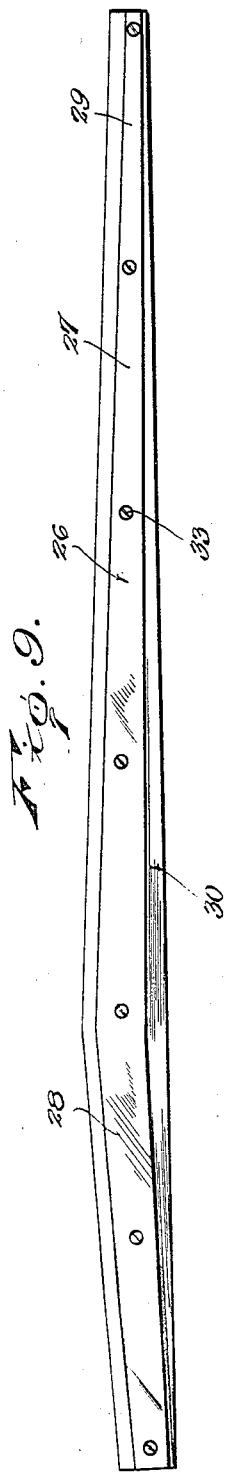
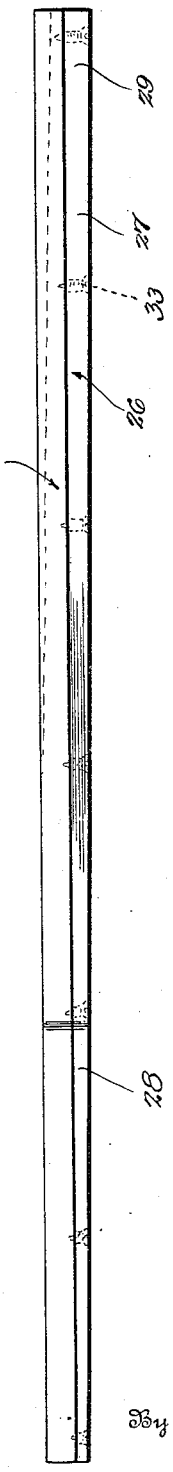
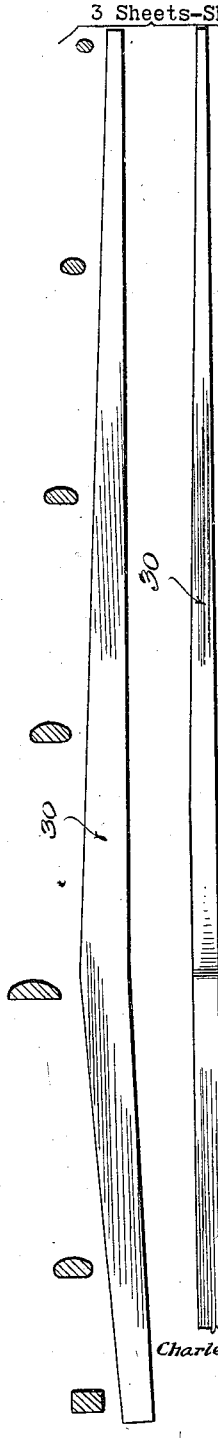
Inventor
Charles D. Briddell.
By
Lacey & Lacey, Attorneys Patented Oct. 30, 1923.

1,472,510

UNITED STATES PATENT OFFICE.

CHARLES D. BRIDDELL, OF CRISFIELD, MARYLAND.

MACHINE FOR SHAPING TONG HANDLES.

Application filed August 5, 1922. Serial No. 579,916.

*To all whom it may concern:*

Be it known that I, CHARLES D. BRIDDELL, a citizen of the United States, residing at Crisfield, in the county of Somerset and State of Maryland, have invented certain new and useful Improvements in Machines for Shaping Tong Handles, of which the following is a specification.

This invention relates to wood working machinery and more particularly to an improved machine for producing oyster tong handles.

It is one of the primary objects of the present invention to provide a machine which will operate in a highly efficient manner to turn to the required shape the wood stock fed thereto thereby producing handles at a lower cost than they can be produced by hand labor and insuring uniformity in shape and dimensions.

Another object of the invention is to provide a wood working machine for the purpose stated which will be adapted for use in the production of tong handles of various shapes and dimensions without any interchange or adjustment of the component parts of the machine.

Another object of the invention is to provide for the expeditious production of the tong handles through the employment of a novel form of template.

In the accompanying drawings:

Figure 1 is a side elevation of the machine embodying the invention;

Fig. 2 is a top plan view of the machine;

Fig. 3 is a vertical transverse sectional view taken substantially on the line 3—3 of Fig. 2 and illustrating more particularly the cutter and the template abutment which is associated therewith, the view also illustrating the template and the piece of stock associated therewith;

Fig. 4 is a horizontal sectional view substantially on the line 4—4 of Fig. 1;

Fig. 5 is a perspective view of the template and the formed or shaped stock after removal from the machine;

Fig. 6 is a detail sectional view substantially on the line 6—6 of Fig. 5;

Fig. 7 is a view similar to Fig. 6 illustrating a modification of the invention;

Fig. 8 is a view illustrating a pair of the handles, produced by the machine, assembled;

Fig. 9 is a plan view of the template and the piece of stock assembled therewith;

Fig. 10 is an edge view of the assemblage shown in Fig. 9;

Fig. 11 is a group view illustrating one of the completed handles in plan and edge elevation and illustrating also in transverse section its cross sectional contour at various points in its length;

Fig. 12 is a view similar to Fig. 3 illustrating an auxiliary cutter head employed for the purpose of rounding off the inner edges of the tong handles.

The machine embodies a supporting structure in the nature of a table indicated in general by the numeral 1 and preferably embodying supporting legs 2 and a top 3 supported thereby. The numeral 4 indicates in general a cutter head which is supported for operation above the plane of the table top 3 and past which the work is to be fed during the operation of the machine. The cutter head 4 comprises a hub 5 which is fitted on to the upper end of a shaft 6 and secured in place by a nut 7. The cutter head 4 embodies blades 8 which radiate in opposite directions from the hub 5 and which are provided with straight substantially horizontally disposed cutting edges 9, substantially vertical cutting edges 10, and curvilinear cutting edges 11 which extend between and merge with the adjacent ends of the cutting edges 9 and 10. Fitted upon the upper end portion of the shaft 6 preferably fixed between a shoulder 12 thereon and the lower end of the hub 5 of the cutter head 4, is an abutment member 13 which is exteriorly cylindrical and with which the template is to coact in the operation of the machine as will presently be made apparent. The table top 3 is formed with an opening 14 through which the shaft extends. A bearing 15 is secured upon the underside of the table top and journals the upper portion of the shaft 6 in position concentric to the opening 14. For a purpose to be presently made clear, the table top 3 is provided, concentric to the opening 14 and in the upper side, with a seating recess 14ᵃ in which is removably seated an annular filler 14$^b$ the upper surface of which is flush with the upper surface of the table top and the opening 14$^c$ of which is of a diameter slightly greater than that of the abutment 13.

A pulley 16 is fixed upon the shaft and constitutes one element of a power transmitting means whereby rotary motion is imparted to the shaft.

The lower portion of the shaft 6 is journaled in a bearing 17 which is mounted for sliding movement in a suitable guide 18 upon an upright 19 arranged beneath the table top 3. The bearing 17 is provided with a boss 20 having threads 21 which coact with the threads of an adjusting screw 22 mounted in bearing brackets 23 beneath the table top, a hand wheel 24 being fixed at the upper end of the adjusting screw to provide for its rotation and for a consequent up and down adjustment of the bearing 17. Collars 25 are fixed upon the shaft 6 above and below the bearing 17 and serve to connect the shaft for up and down adjustment with the bearing without, however, interfering with rotation of the shaft.

In connection with the machine there are employed a number of templates depending upon the number of different sizes and shapes of handles to be produced, and one of such templates is illustrated in the drawings and indicated in general by the numeral 26. This template is preferably of hardwood or metal or a combination of the two and, generally speaking, it is of the shape of the handle which is to be produced, comprising a relatively long portion 27 which is gradually tapered in the direction of its outer end and between its lateral edges, and a shorter portion 28 which is similarly tapered and which is disposed at an obtuse angle to the portion 27. While, as stated, the template is of substantially the shape of the handle to be produced, nevertheless it differs in the respect that its portion 27 is gradually increased in thickness in the direction of its outer end as indicated by the numeral 29 and the purpose of thus forming the template will presently be explained. As illustrated in Figs. 9 and 10 of the drawings, a piece of wood stock from which the handle is to be formed, and indicated by the numeral 30, is disposed against one face of the template 26, this piece of stock being of somewhat greater width dimensions than the template and being substantially of uniform thickness throughout its entire length. In order that the piece of stock 30 may be retained in assembled relation with the template 26, the template is preferably provided at intervals in its length with threaded sockets 31 and countersinks 32, and threaded studs 33 are fitted into the sockets and have their heads 34 received flush within the countersink, the studs at their outer ends terminating substantially flush with the face of the template against which the piece of stock is to be disposed and being provided at their said ends each with a spur 35 designed to penetrate the piece of stock to a greater or less depth as shown, for example, in Fig. 6 of the drawings, it being understood, of course, that after the stock has been turned to the required shape, it may be readily pried loose from the template. In Fig. 7 of the drawings so far as this feature is concerned, there is shown a slight modification wherein a nut 36 is disposed within a recess 37 in the face of the template against which the stock is to be disposed, and is threaded on to the stud 33, the parts being thus securely anchored.

In the operation of the machine the template with the stock assembled therewith is to be fed through the machine by advancing it over the surface of the table top 3 and with the edge of the template riding against the periphery of the template abutment 13 as most clearly shown in Figs. 2 and 3 of the drawings. In order that the template and the stock may be held firmly in position upon the surface of the table top while passing the cutter head, rocking frames 38 are mounted, as at 39, upon the table top at opposite sides of the cutter head 4, and rolls 40 are journaled in the ends of the side members of the said frames which are next adjacent the said cutter head, the rolls extending transversely of the table top and substantially at right angles to the line of travel of the template and work in passing over said top. The side members of each frame 38 are connected by a cross piece 41, and a compression spring 42 is arranged between each end of the table and the cross piece of each frame, the side members of each frame being curved downwardly toward their juncture with the cross piece as indicated by the numeral 43 so as to dispose the relatively remote ends of the frames opposite the said ends of the table. The springs 42 exert a pressure in an outward direction against the said ends of the frames and thus yieldably hold the frames rocked upon their pivots 39 so as to maintain the rolls 40 in firm contact with the upper surface of the stock as it is moved over the surface of the table top. This engagement of the rolls 40 will, of course, serve to hold the work firmly in position while it is passing the cutter head, but in order that the rolls may be elevated so as to permit the more ready introduction of the work and template beneath them, angle levers 44 are mounted as at 45 upon the ends of the table in juxta-position to the outer end of each respective frame, and the upwardly extending arm of each of these levers is connected by a pivot pin 46 to a depending arm 47 upon the underside of the connecting cross piece 41 of the respective frame, the pin working in a slot 48 as shown in Fig. 1. The other arm of each angle lever extends downwardly and is provided with a handle 49 whereby it may be conveniently grasped, upward swinging of this arm of the lever serving to swing the outer end of the respective frame inwardly toward the end of the table and against the tension of the spring 42 and thus elevate the roll 40 carried at its other end.

In order to maintain the stock in proper relation to the cutter head, presser devices are provided at opposite sides of said head so as to coact with the stock or, more specifically, the template with which it is assembled, whether the stock and template be disposed at one side of the head or at the other. Each of the presser devices referred to is indicated in general by the numeral 50 and each comprises an angle member having arms 51 and 52 extending substantially at right angles to each other, the member being pivotally supported at the juncture of its arms as at 53 upon the upper surface of the table top 3. Each arm 51 carries at its outer end a roller 54 adapted to engage against the edge of the template and yieldably held in such engagement through the medium of a spring 55 connected at one end as at 56 to the outer end of the arm 52 and at its other end connected as at 57, preferably adjustably to the table top. A stop 58 is provided in the path of movement of the arm 52 under the influence of the spring 55, and a finger piece 59 extends from the end of the arm 51 and may be grasped for the purpose of swinging the member 50 about its pivot and against the tension of the spring 55 so as to move the roller 54 away from the template abutment 13 and permit of the more ready introduction of the stock and template between the said roller 54 and the template abutment 13.

In the use of the machine a template of the required shape is selected and a piece of wood stock is assembled with the same and secured thereto temporarily by the means previously described. The assemblage will then appear substantially as shown in Fig. 9 of the drawings, and the stock will project marginally a greater or less distance beyond the lateral edges of the template. The assemblage is then introduced into the machine by passing it beneath one of the rolls 40, the shaft 6 having been previously vertically adjusted so as to position the cutter head at such an elevation that its vertical cutting edge 10 will act upon the projecting edge portion of the stock as the stock and template assemblage are fed longitudinally over the table. The cutter head is elevated in the manner stated for the reason that tong handles are ordinarily rectangular in cross section at their lower or butt-ends as shown in the first one of the cross sectional views of Fig. 11, and therefore initially only the vertical cutting edge 10 of the cutter head will act upon the stock. However, after the stock has been fed into the machine a distance sufficient to provide for the cutting of this end of the stock, the hand wheel 24 may be rotated so as to feed the shaft 6 in a downward direction until the cutting edges 11 and 9, as well as the edge 10, will be in operative relation to the work. Due to the contour of these edges, the upper surface of the stock will be given a more or less transversely rounded form as illustrated in the several successive views of the figures. During this operation the adjacent edge of the template will ride in contact with the periphery of the template abutment 13, and in this manner the depth of the cut is controlled and the stock will be given a contour corresponding substantially to the marginal contour of the template. As previously pointed out the template is of gradually increasing thickness in the direction of its end 29 and by reference to Fig. 10 of the drawings and particularly the full and dotted upper lines of said figure, it will be understood that as the corresponding end of the work or stock approaches the cutter head, a gradually increasing depth of the material will be cut away so that the finished handle will have a plane side as shown in the lower view of Fig. 11 and throughout its upper portion will have its upper side or face converged gradually with relation to the first-mentioned side or face, the said portion of the handle being thus gradually decreased in thickness toward its upper end. Of course, after one side of the stock has been acted upon by the cutter head, the stock is again fed through the machine with its other side presented to the cutter head.

After the tong handle has been shaped as described, it is desirable to reduce or remove the sharp corners or edges left on the under side. To effect this result, the cutter 4 and the retaining nuts, the abutment 13 and filler 14$^b$ are removed, and a cutter 60 is fitted on the shaft 6 to rest on the shoulder 12 and be held thereon by retaining nuts, as shown in Fig. 12. This cutter 60, it will be noted, is housed in the recess 14$^a$ and is provided with an undercutting edge 61 to engage the corner or edge of the stock which is run over the cutter. Inasmuch as the handle has now been shaped, a template is not necessary in this operation, and if an abutment be employed it will be placed above the cutter instead of under it as when using the cutter 4.

Having thus described the invention, what is claimed as new is:

1. In a wood-working machine, the combination of a cutter, a stationary support over which work may be fed in contact with the cutter, a rocking frame fulcrumed upon the support and having one end extending beyond the support and downwardly at the side thereof, a presser member carried by the opposite end of the said frame and adapted to bear upon the work adjacent the cutter to hold the work to the support, an expansion spring secured to and disposed between the lower end of the rocking frame and the side of the support, and an angle lever fulcrumed upon the side of the support and having an upwardly extending arm attached to the downwardly extending end of the rocking frame, the other arm of said lever being free and extending downwardly.

2. In a wood-working machine, the combination of a stationary supporting surface over which stock may be moved, a cutter operating adjacent said surface to act upon the stock, means for holding the stock to the said surface, an angle lever fulcrumed upon said surface at the side of the cutter and having one arm extending inwardly toward the cutter and another arm extending outwardly, a presser member on the end of the inwardly extending arm to engage stock and hold the same to the cutter, a spring acting on the outwardly extending arm of the lever to move the same inwardly, and a stop on the supporting surface at the inner side of said outwardly extending arm of the angle lever.

3. In a wood-working machine, the combination of a stationary supporting surface over which stock may be moved, a cutter operating adjacent said surface to act upon the stock, means for holding the stock to said surface, an angle lever fulcrumed upon said surface at the side of the cutter and having one arm extending inwardly toward the cutter and another arm extending outwardly, a presser member on the end of the inwardly extending arm to engage the stock and hold the same to the cutter, a finger piece projecting from the inwardly extending arm of the angle lever, a spring acting on the outwardly extending arm of the lever to move the same inwardly, and a stop on the supporting surface at the inner side of the outwardly extending arm of the lever.

In testimony whereof I affix my signature.

CHARLES D. BRIDDELL. [L. S.]